US011065624B2

(12) United States Patent
Lucas et al.

(10) Patent No.: US 11,065,624 B2
(45) Date of Patent: Jul. 20, 2021

(54) CARTON REDUCER/BAG OPENER DEVICE

(71) Applicant: Scott Equipment Company, New Prague, MN (US)

(72) Inventors: Richard R. Lucas, Jordan, MN (US); Glen Jeurissen, Belle Plaine, MN (US)

(73) Assignee: Scott Equipment Company, New Prague, MN (US)

( * ) Notice: Subject to any disclaimer, the term of this patent is extended or adjusted under 35 U.S.C. 154(b) by 171 days.

(21) Appl. No.: 16/515,374

(22) Filed: Jul. 18, 2019

(65) Prior Publication Data

US 2021/0001347 A1 Jan. 7, 2021

Related U.S. Application Data

(60) Provisional application No. 62/870,298, filed on Jul. 3, 2019.

(51) Int. Cl.
*B02C 18/18* (2006.01)
*B02C 18/22* (2006.01)
*B02C 18/24* (2006.01)
*B02C 18/06* (2006.01)

(52) U.S. Cl.
CPC ............ *B02C 18/18* (2013.01); *B02C 18/062* (2013.01); *B02C 18/2216* (2013.01); *B02C 18/24* (2013.01)

(58) Field of Classification Search
CPC ....... B02C 18/142; B02C 18/18; B02C 18/16; B02C 18/24; B02C 18/062; B02C 18/2216
See application file for complete search history.

(56) References Cited

U.S. PATENT DOCUMENTS

| 4,560,112 | A | * | 12/1985 | Rouse | ................... | B02C 18/142 |
| | | | | | | 241/166 |
| 4,687,144 | A | * | 8/1987 | Irwin | .................... | B02C 18/142 |
| | | | | | | 241/49 |
| 5,350,122 | A | * | 9/1994 | Hundt | ................. | B02C 18/0084 |
| | | | | | | 241/154 |
| 5,887,808 | A | | 3/1999 | Lucas | | |
| 6,248,156 | B1 | | 6/2001 | Lucas | | |
| 6,713,112 | B1 | | 3/2004 | Lucas | | |
| 7,178,749 | B2 | * | 2/2007 | Parrett | ................ | B02C 18/0092 |
| | | | | | | 241/101.2 |
| 7,422,172 | B1 | * | 9/2008 | Lo | ........................ | B02C 18/0007 |
| | | | | | | 241/236 |
| 8,061,640 | B2 | * | 11/2011 | Cotter | ..................... | B02C 13/06 |
| | | | | | | 241/101.01 |

(Continued)

*Primary Examiner* — Faye Francis
(74) *Attorney, Agent, or Firm* — Vidas, Arrett & Steinkraus, P.A.

(57) ABSTRACT

A package reducing device includes a hopper having lap over rings, first and second main shafts which traverse the hopper, first and second pipe shafts are secured to the main shafts, where the ends of the pipe shafts are positioned interior to the lap over rings. First and second rings extend from the pipe shafts having recessed openings to position a fastener interior to the surface of the rings. Tooth plates having teeth are attached to the rings. A first motor rotates the one pipe shaft at a first rate and a second motor rotates another pipe shaft at a slower rate of rotation. The pipe shafts are rotated in an inboard direction, and the motors include variable frequency drives. The teeth reduce the size of packaging and food transported inside of the packaging during use of the invention.

19 Claims, 7 Drawing Sheets

(56) References Cited

U.S. PATENT DOCUMENTS

| | | | |
|---|---|---|---|
| 8,714,467 B2 | 5/2014 | Lucas et al. | |
| 8,727,254 B2 | 5/2014 | Lucas et al. | |
| 9,174,219 B2 | 11/2015 | Lucas et al. | |
| 9,174,220 B2 | 11/2015 | Lucas et al. | |
| 9,434,533 B2 | 9/2016 | Lucas | |
| 10,864,523 B2 * | 12/2020 | Rogers | B02C 18/18 |
| 2004/0000606 A1 * | 1/2004 | Diemunsch | B02C 18/184 |
| | | | 241/236 |
| 2004/0076726 A1 | 4/2004 | Lucas | |
| 2005/0040263 A1 * | 2/2005 | Parke | B02C 18/142 |
| | | | 241/30 |
| 2009/0189004 A1 * | 7/2009 | Pallmann | B05C 17/00576 |
| | | | 241/236 |
| 2013/0175379 A1 * | 7/2013 | Vantrease | B02C 18/16 |
| | | | 241/167 |
| 2017/0079219 A1 * | 3/2017 | Stanley | B02C 18/145 |
| 2017/0087558 A1 * | 3/2017 | Davis | B02C 18/18 |
| 2019/0048929 A1 * | 2/2019 | Schwelling | B02C 19/0081 |
| 2019/0082589 A1 * | 3/2019 | Litwiller | A01B 33/024 |
| 2019/0151856 A1 * | 5/2019 | Seiler | B02C 18/0084 |
| 2019/0335673 A1 * | 11/2019 | Stanley | A01G 3/002 |
| 2020/0129987 A1 * | 4/2020 | Candiotto | B02C 18/145 |
| 2020/0316609 A1 * | 10/2020 | Lindner | B02C 4/08 |

* cited by examiner

CARTON REDUCER/BAG OPENER DEVICE

CROSS-REFERENCE TO RELATED APPLICATIONS

This application claims the benefit of U.S. Provisional Patent Application Ser. No. 62/870,298, as filed in the United States Patent Office on Jul. 3, 2019, which is incorporated herein by reference in its entirety.

FIELD OF THE INVENTION

This invention is directed to improving the recycling of previously packaged food items including the recycling of the food and the packaging materials for the food.

BACKGROUND

The cartoon reducer/bag opener is generally related to the opening of carrier boxes, cartons or plastic packaging, where the boxes, cartons or plastic packaging each include a plurality of individually packaged food items. In general the food items have expired and are no longer available for consumption by humans. The food contents as well as the individual packaging and the carrier boxes/bags may be recycled. The food contents may be processed into animal feed, compost and/or biogas and the cardboard or plastic packaging materials may be recycled as known.

In the past, an individual was required to individually open a carrier box, carton or plastic package in order to gain access to the individually packaged food items. The individual would then open each individual packaged food item separating the food from the food packaging for recycling.

The known process for recycling of transported containers and individually packaged food items was extremely labor intensive reducing the profits and/or other benefits to be obtained through recycling activities.

In the past cardboard and/or plastic shredders have been known. However, the known cardboard and/or plastic shredders were unsuitable for opening transport cartons or plastic packaging containing individual packages of food items. The cardboard and/or plastic shredders inflicted an undesirable level of damage to the cardboard, plastic and/or food, intermixing the food with small pieces or shards of cardboard, plastic or other packaging rendering separation for recycling extremely difficult.

Also in the past plastic shredding frequently resulted in the undesirable wrapping of the plastic about the rotational shaft or drum. Plastic shredders were required to receive regular maintenance for the removal of accumulated wrapped plastic material prior to continued use in shredding activities. The failure to remove accumulated wrapped plastic materials frequently resulted in the further reduction of the plastic into shards and the mixing of the small plastic shards with the separated food, rendering removal of small plastic shards from the food extremely difficult. No device has been known to address and to solve these identify problems associated with the prior art during recycling of expired food items.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

The carton reducer/bag opener in at least one embodiment includes a hopper and two main shafts which are rotated inwardly relative to each other in opposite directions.

In at least one embodiment, the two main shafts are rotated at different speeds which cause the teeth on the pipe shafts to rip and shred transported boxes or plastic containers, as well as individually packaged food items.

In at least one embodiment, the rotation of the two main shafts at different speeds reduces packaging and food items into a sufficiently small size to facilitate recycling. The packaging and food components are not over shredded, and do not intermix shards of shredded material with the reduced food, which in turn improves the recycling of the food and packaging materials.

In at least one embodiment a variable speed motor is engaged to each main shaft through the use of a belt drive where the variable speed motor may be individually and adjustably set to a desired frequency of rotation, for rotation of a main shaft and pipe shaft bearing shredder teeth.

In some embodiments each of the variable speed motors may be operated for rotation of the main shaft and pipe shaft in either a clockwise or counterclockwise direction.

In at least one embodiment, a plurality of shaped teeth may be releasably secured to a pipe shaft to reduce cardboard and/or plastic into a desired size while simultaneously opening individual packages of food items which are then recycled into animal feed.

In at least one embodiment, each tooth is mounted to a ring engaged to the exterior surface of a pipe shaft through the use of a countersink tooth attachment aperture. The countersinking of the tooth attachment aperture reduces the undesirable accumulation of material and/or plastic onto the pipe shaft during recycling activities.

In at least one embodiment, the main shaft is disposed interior to a large diameter pipe shaft having opposite ends. Proximate to the opposite ends of the large diameter pipe shaft, the hopper end walls each include a lap over ring. Each lap over ring encircles an end of the large diameter pipe shaft to reduce the undesirable accumulation and wrapping of plastic around the ends of the large diameter pipe shaft.

In at least one embodiment, the walls of the hopper proximate to the rotating teeth may include a stripper plate to further reduce the size of material between the rotating teeth and the stripper plates.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the

DETAILED DESCRIPTION OF THE PREFERRED EMBODIMENTS

Figure 1:
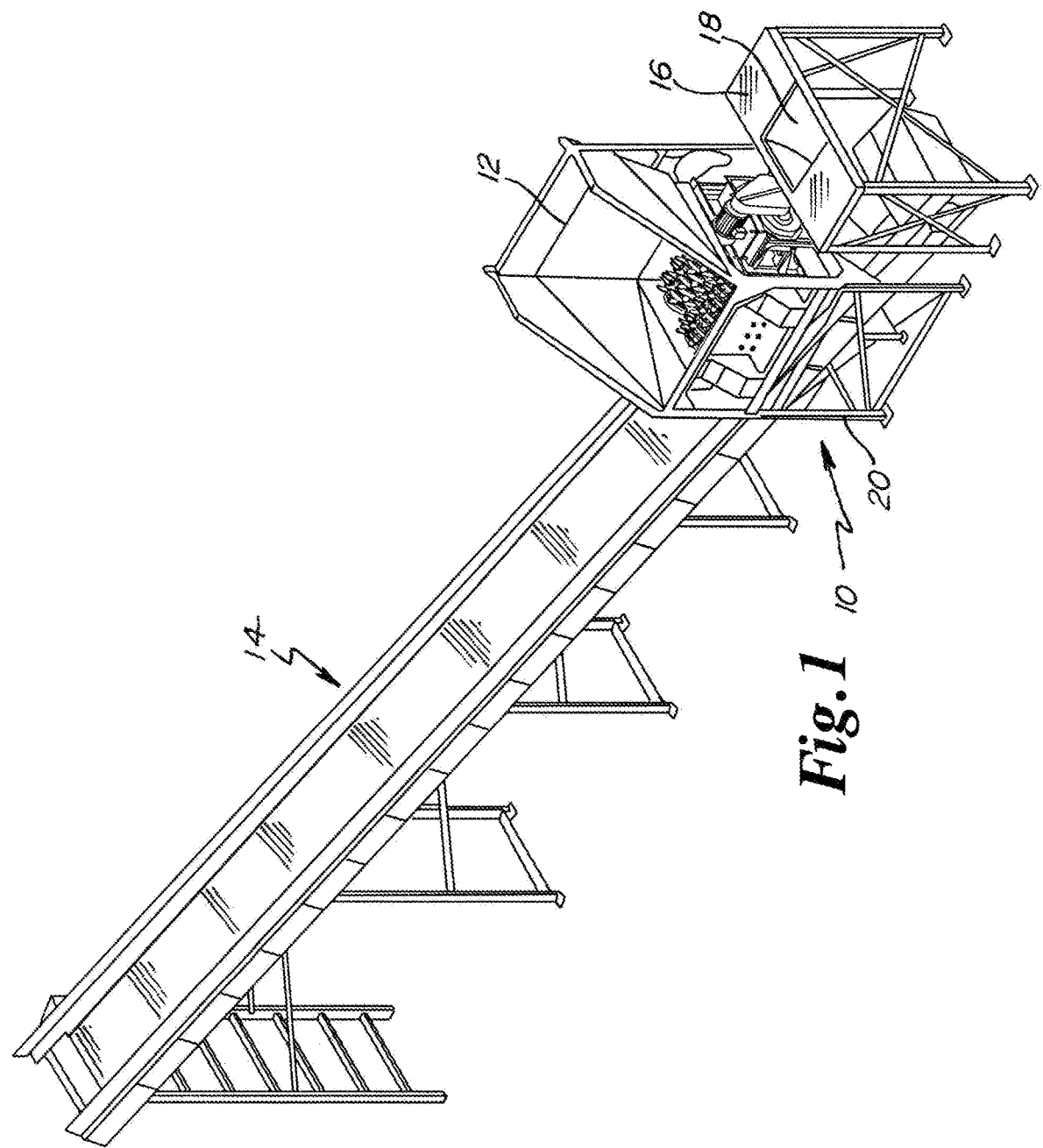
FIG. 1 is an isometric perspective view of the invention with a conveyor and a supplemental opening structure.

Referring to FIG. 1 the carton reducer/bag opener is generally referred to by reference numeral 10. As may be seen in FIG. 1, carton reducer 10 includes an enlarged access hopper 12. Access hopper 12 facilitates the positioning of cartons containing individual packages of food items above the carton reducer 10. As may be seen in FIG. 1, carton reducer 10 is positioned above a conveyor 14. Conveyor 14 is used to transport the reduced food contents and reduced cardboard and individual packaging materials to a separator (not shown). The separator (not shown) separates the different types of materials for recycling. The food items as removed from the individual packaging are transported to a processor (not shown) for formation of animal feed, compost and/or biogas.

FIG. 1 additionally shows an opening table 16 from the prior art. Opening table 16 in the past was used by an individual to open cartons and individual packages of food, where the food transported within the individual packages dropped down a chute 18, for transportation to a processor (not shown) for the formation of animal feed, compost and/or biogas.

In addition, carton reducer 10 is preferably elevated relative to the conveyor 14 by a frame 20. Frame 20 is substantially rectangular in shape elevating the open bottom 22 (FIG. 2) of carton reducer 10 a desired dimension relative to the conveyor 14.

In general, referring to FIGS. 1 through 11, the carton reducer 10 reduces the size of cartons transporting individual packages of food products. During the reduction of the size of the cartons, the carton reducer 10 pre-opens the individual packages of food products automatically eliminating the need for human handling and opening of either the cartons, or the individual packages of food items. The reduced cartons, opened individual packages of food items and any food dropped through the open bottom 22 of the carton reducer 10 is transported for separation, recycling, and/or processing of the food into animal feed, compost and/or biogashaving a. The carton reducer 10 also functions in the identical manner during the opening of container bags (which may be formed of plastic) which are used to transport individual packages of food items. During operation the carton reducer 10 does not significantly damage or reduce the individually packaged food items to an undesirable size.

In general, the carton reducer 10 is formed of a first main shaft 52 having a first pipe shaft 58 and a second main shaft 54 having a second pipe shaft 60. During operation of the carton reducer 10, plastic and/or cardboard does not build up by wrapping around the first pipe shaft 58 and/or second pipe shaft 60. The buildup of plastic and/or cardboard by wrapping around pipe shafts is a maintenance issue, necessitating significant shutdown and maintenance time, and is a difficult maintenance task. Removal of the buildup of plastic and/or cardboard is required because at some point the wrapped plastic and/or cardboard will continue to grow in size until reduction must occur. At this point the wrapped material will be reduced to small shards which will intermix with the food. The separation of small shards of material as mixed with the food is time-consuming and problematic.

In at least one embodiment, the carton reducer 10 is used to crush, break and tear boxed and bagged food items. During use, the individual boxes and bags of food items are additionally torn open and the food contents of the individual boxes or bags are released to drop downwardly through the open bottom 22 of carton reducer 10.

The tearing, crushing and reduction to the overall size of the cardboard or plastic packaging materials is accomplished by exposure to the rotation of the first pipe shaft 58 and the second pipe shaft 60. The first pipe shaft 58 and the second pipe shaft 60 are rotated in an inboard direction to move cartons or container bags to a location between the first pipe shaft 58 and second pipe shaft 60 for processing. At least one of the first pipe shaft 58 and second pipe shaft 60 is operated at a different speed or rotational frequency relative to the other rotor. The differential rotation speeds or frequency between the first pipe shaft 58 and second pipe shaft 60 achieves the tearing and reduction action to reduce the size of the cardboard or plastic materials and to open the individual packages of food items. In contrast, rotation of the first pipe shaft 58 and the second pipe shaft 60 at an identical speed or frequency will result in the crimping and smashing of the container bags or carton boxes and will not tear or open individual packages of food items.

The differential in the rotational speed or frequency between the rotation of the pipe shaft 58 relative to the second pipe shaft 60 may be adjusted to increase or decrease tearing action of the cartons/boxes, plastic containers and/or individual packages transporting food items. A larger differential in the rotational speed or frequency between the first pipe shaft 58 and second pipe shaft 60 provides a greater reduction in the size of the cartons, plastic containers, and/or individual packages, resulting in smaller components for recycling. Alternatively a smaller differential in the notational speed or frequency between the first pipe shaft 58 and second pipe shaft 60 provides a smaller reduction in the size of cartons, plastic containers, and/or individual packages result in larger components for recycling.

In general, the first main shaft 52 having the first pipe shaft 58 is engaged to a first drive system 28 and the second main shaft 54 having the second pipe shaft 60 is engaged to a second drive system 30. The first drive system 28 and the second drive system 30 are variable frequency drives and are controlled by a programmable logic controller. The first main shaft 52 and first pipe shaft 58 may thereafter be programmed for a first rate of rotation for a first period of time. The second main shaft 54 and second pipe shaft 60 may also be programmed at a second rate of rotation for the first period of time. At the expiration period of the first period of time, the first main shaft 52 and first pipe shaft 58 may rotate at the second rate of rotation for either the first or second period of time. Likewise, the second main shaft 54 and second pipe shaft 60 may rotate at the first rate of rotation for either a first or second period of time.

In at least one embodiment, the first pipe shaft 58 has a plurality of first teeth 32 and the second pipe shaft 60 has a plurality of second teeth 34. During operation, the teeth of either the first pipe shaft 58 or the second pipe shaft 60, which is rotating at a slower frequency or rate of rotation, will remove material which may have built up on the first pipe shaft 58 or the second pipe shaft 60, whichever is rotating at the faster frequency or rate of rotation. Each time that the first main shaft 52 and first pipe shaft 58, and second main shaft 54 and second pipe shaft 60, alternate the frequencies or rates of rotation, the removal of wrapped material from one or both rotors may occur.

Figure 2:
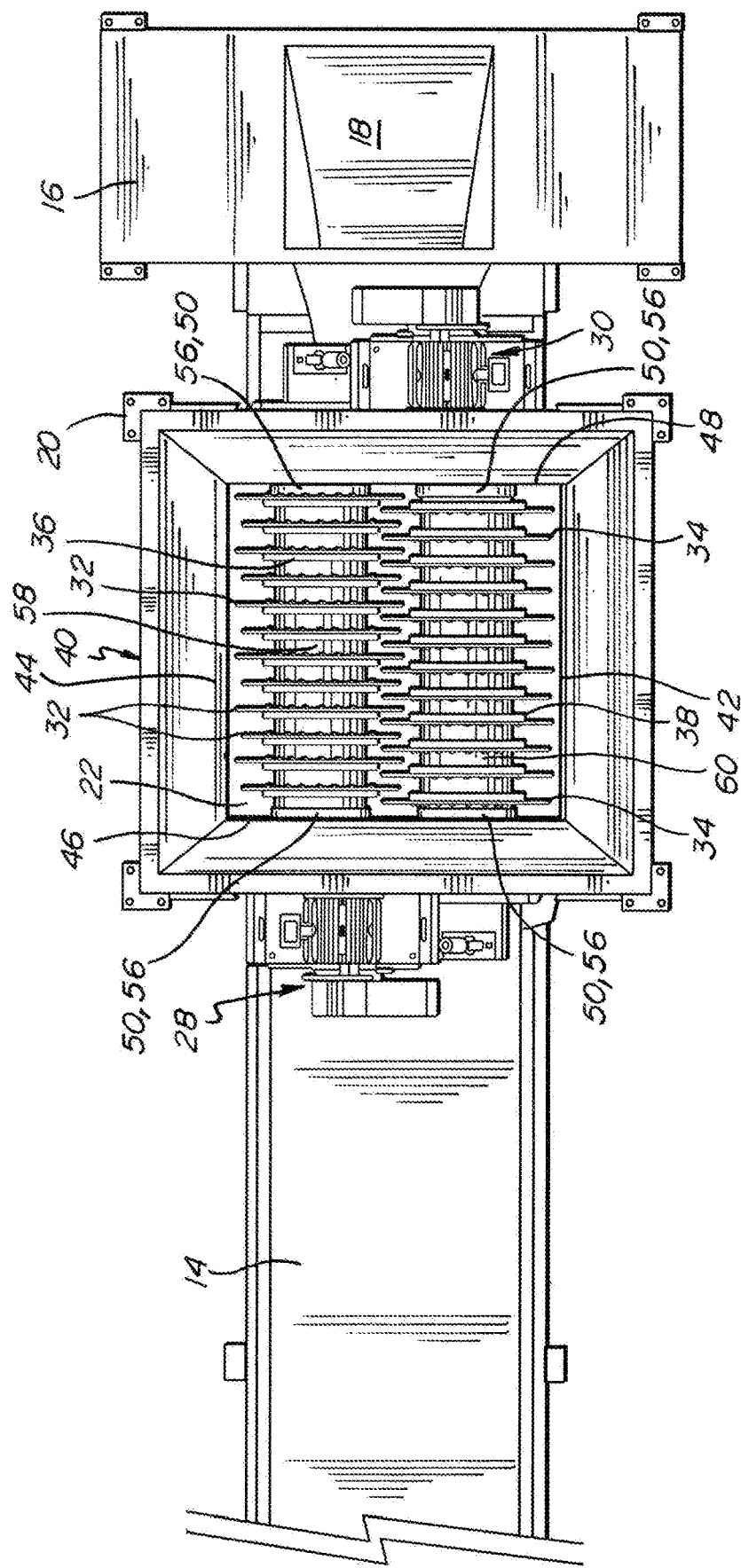
FIG. 2 is a top elevation view of the invention with a conveyor and a supplemental opening structure.
Figure 3:
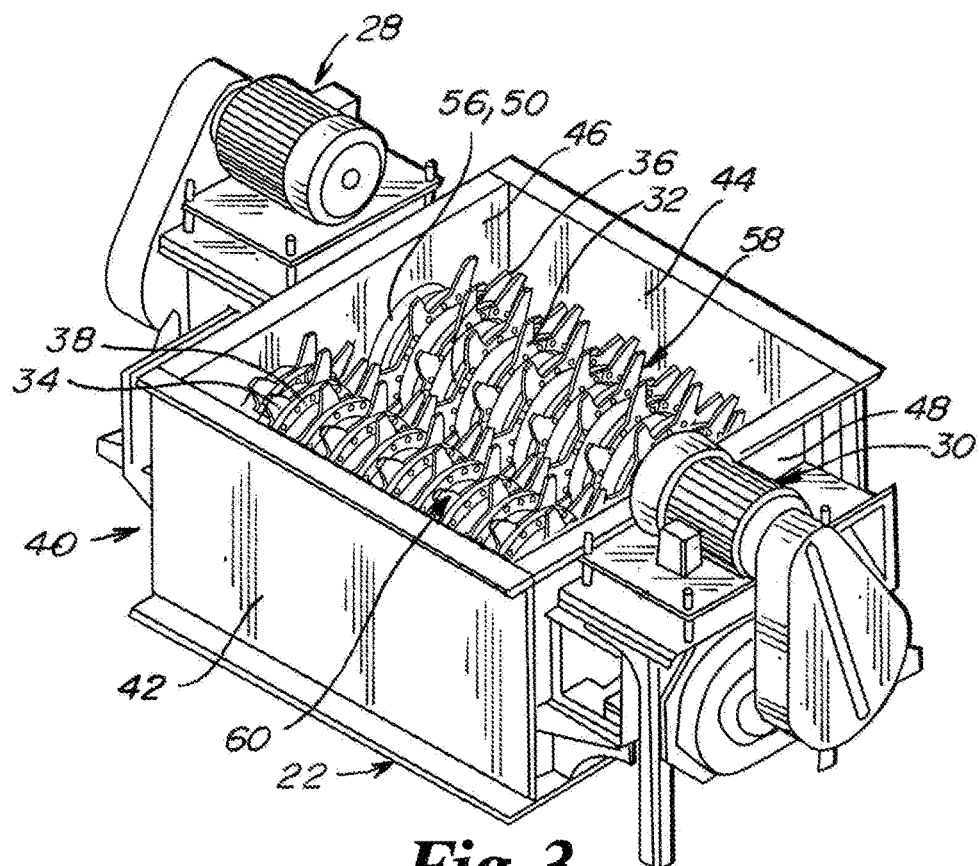
FIG. 3 is a detail isometric perspective view of the carton reducer/bag opener invention.
Figure 4:
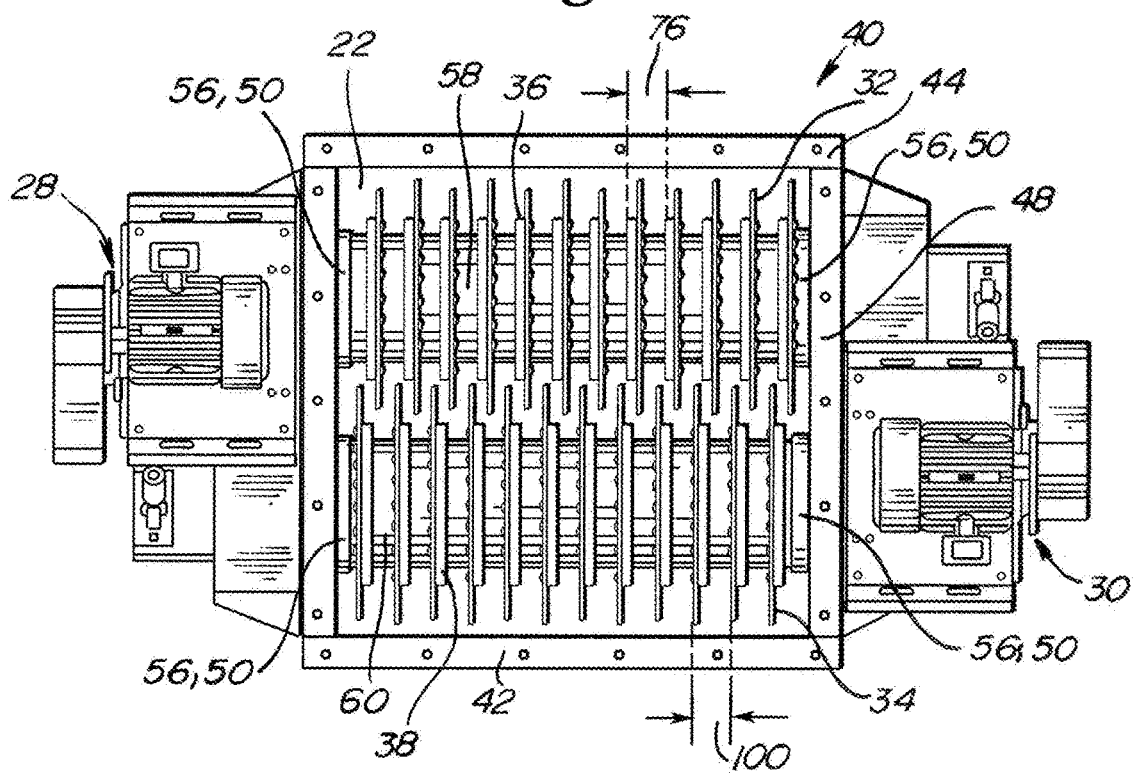
FIG. 4 is a top elevation view of the carton reducer/bag opener invention.

As may be seen in FIG. 2, the carton reducer 10 includes a housing 40. Housing 40 is substantially square in shape and is formed of steel, stainless steel, carbon steel, other metal materials, other materials, composite materials or combinations of the materials identified herein, provided that the features and functions identified herein do not fracture or fail during use of the carton reducer 10. Housing 40 has a large opening dimension proximate to the top. The open bottom 22 is smaller in dimension than the top opening of the housing 40. Open bottom 22 is disposed under the first main shaft 52 and first pipe shaft 58 as well as the second main shaft 54 and second pipe shaft 60. Each side of the housing 40 may have a length dimension of approximately 60 inches. In alternative embodiments, the length dimension for each side of the housing 40 may be more or less than 60 inches at the preference of an individual.

In at least one embodiment, the housing 40 has a front side wall 42 and a rear side wall 44. In addition, housing 40 has a left side wall 46 and a right side wall 48. Housing 40 may have a height dimension of approximately 36 inches. In other embodiments the height dimension for housing 40 may be larger or smaller than 36 inches at the discretion of an individual.

In at least one embodiment, the left side wall 46 and the right side wall 48 each include two equally spaced and aligned openings 50. The aligned openings 50 of the left side wall 46 and right side wall 48 receive the first main shaft 52 and the second main shaft 54 respectively. A lap over ring 56 is preferably affixed to each of the left side wall 46 and right side wall 48 encircling each aligned opening 50.

The housing 40 and each lap over ring 56 is formed of steel, stainless steel, carbon steel, other metal materials, other materials, composite materials or combinations of the materials identified herein, and is preferably welded to the respective left side wall 46 or right side wall 48.

Alternatively, the lap over rings 56 may be formed of 304 stainless steel, 316 stainless steel, or carbon steel, however other metallic or other materials including composite materials may be used, provided that the features and functions as described do not fail or fracture during use of the carbon reducer 10 for the intended purpose as identified herein.

In alternative embodiments, the lap over rings 56 may be integral or secured to the left side wall 46 or the right side wall 48 by any other secure mechanical fastening methods including welds, screws, bolts or other fasteners. Each of the openings 50 are preferably centrally disposed relative to each lap over ring 56.

In at least one embodiment, each lap over ring 56 extends toward the interior of the housing 40 a distance of between 1 and ¼ inches and 4 inches. In a preferred embodiment, each lap over ring 56 extends and covers each end of the large diameter first pipe shaft 58 and second pipe shaft 60 by a dimension of at least 1 inch. The diameter of each lap over ring 56 is preferably larger than the diameter dimension of the first pipe shaft 58 and the second pipe shaft 60 by at least ¼ inch, which permits the first pipe shaft 58 and the second pipe shaft 62 to rotate within the respective lap over ring 56.

In at least one embodiment, the lap over rings 56 function to deter the wrapping of reduced material at the opposite ends of each of the first pipe shaft 58 and second pipe shaft 60 during use of the carton reducer 10.

Figure 7:
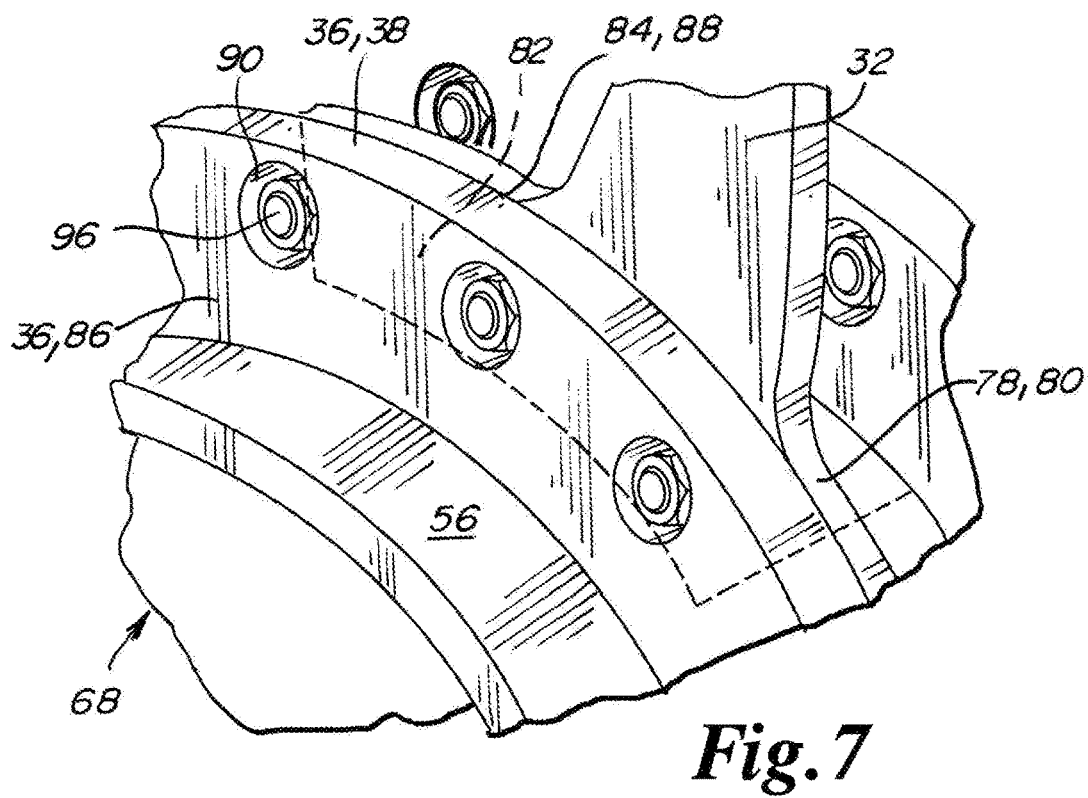
FIG. 7 is a detail isometric perspective view of one alternative embodiment of the affixation of the teeth to the pipe shafts of the carton reducer/bag opener invention.
Figure 8:
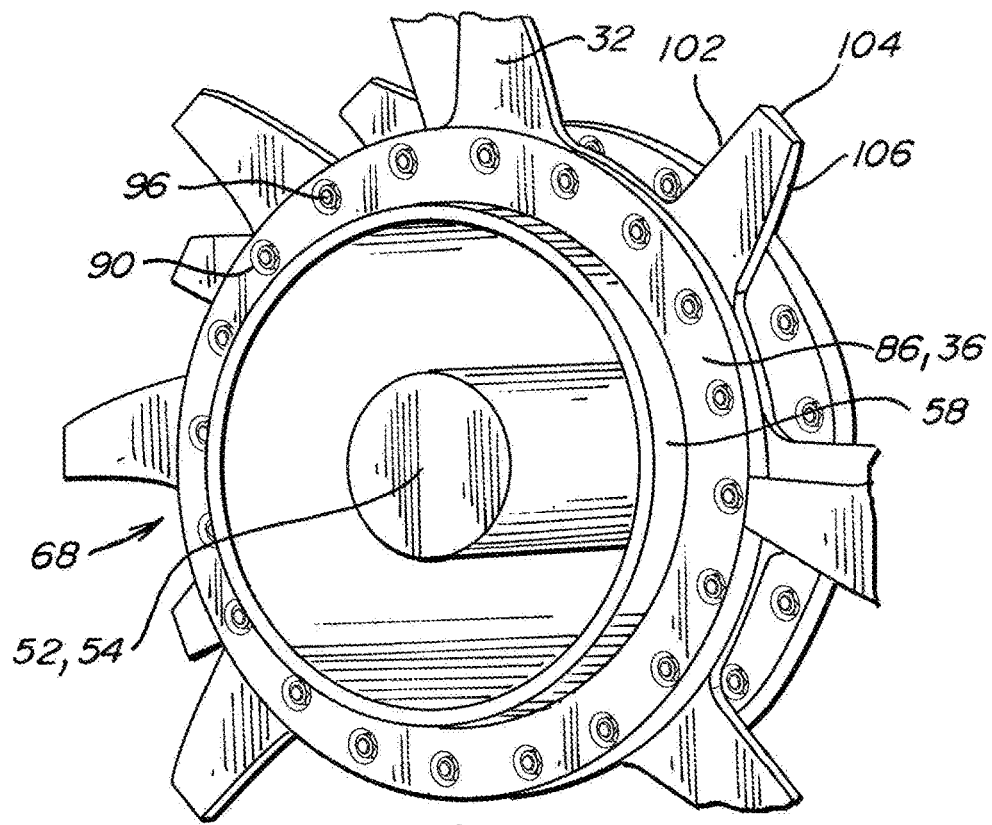
FIG. 8 is a detail isometric perspective view of one alternative embodiment of the end of a pipe shaft, shaft and teeth of the carton reducer/bag opener invention.
Figure 9:
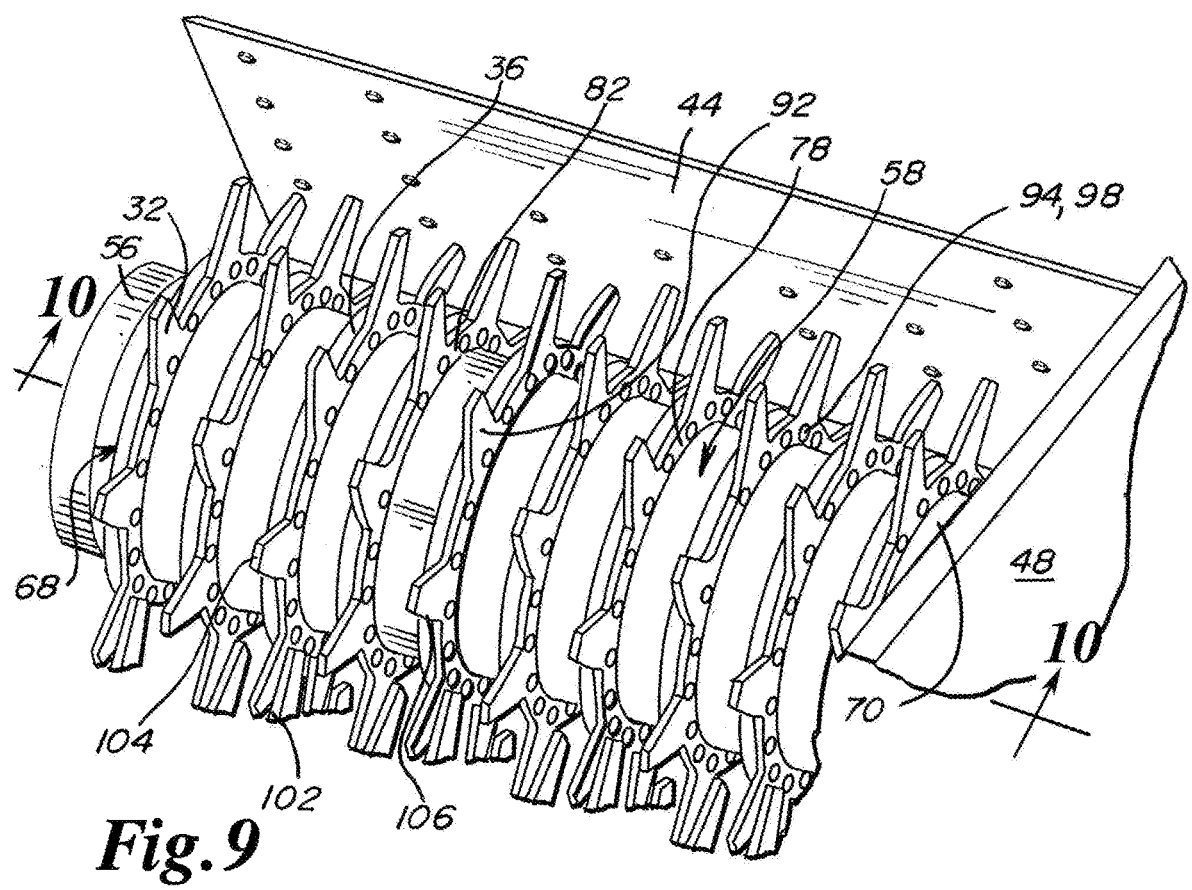
FIG. 9 is a detail partial isometric perspective view of one alternative embodiment of a pipe shaft, teeth and rear side wall of the carton reducer/bag opener invention.
Figure 10:
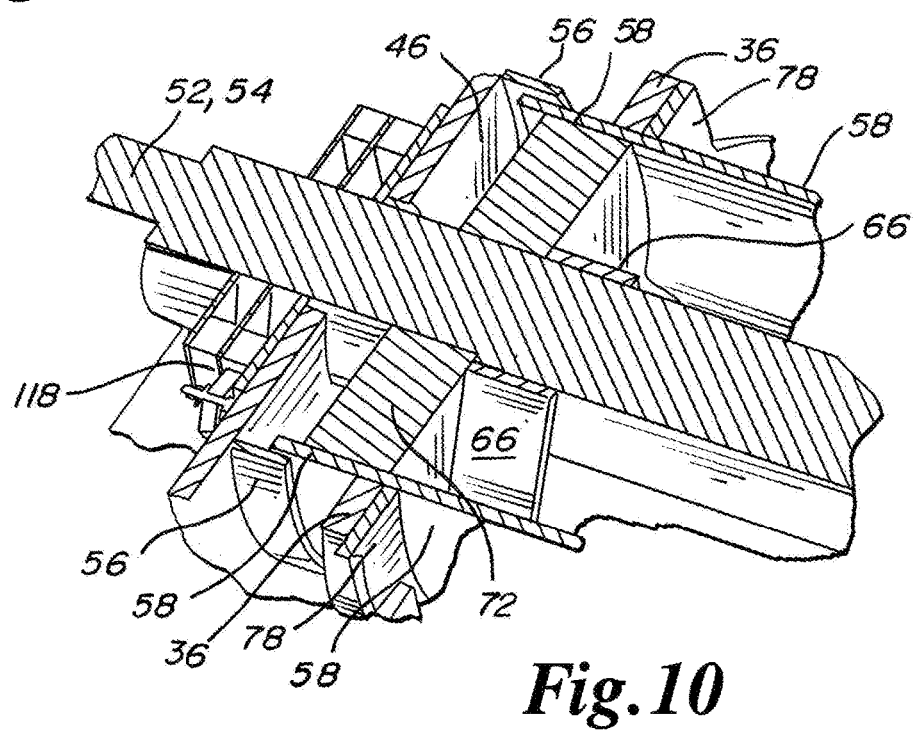
FIG. 10 is a detail partial isometric perspective cross-sectional side view of one embodiment of one end of the main shaft and pipe shaft of the carton reducer/bag opener invention taken along the line of 10-10 of FIG. 9.

Referring specifically to FIG. 8, the first end 68 of the first pipe shaft 58 is shown in detail prior to insertion into the lap over ring 56. The lap over ring 56 is engaged to the left side wall 46. In FIG. 7 the first end 68 of the first pipe shaft 58 has been inserted within the interior of the lap over ring 56 by a distance dimension of between ½ inch and 3 inches. The diameter of the lap over rings 56 is larger than the respective diameter of the first or second pipe shafts 58, 60 by at least ¼ inch. FIG. 10 in cross section, additionally shows the overlap of the lap over ring 56 to the exterior of the first end 68 of the first pipe shaft 58.

In a preferred embodiment, the first main shaft 52 is centrally disposed within and is secured to the interior of the first pipe shaft 58. The second main shaft 54 is centrally disposed within and is secured to the interior of the second pipe shaft 60. The rotation of the first main shaft 52 rotates the first pipe shaft 58 and the rotation of the second main shaft 54 rotates the second pipe shaft 60.

A plurality of first rings 36 are regularly spaced along and extend perpendicularly outwardly from the exterior surface of the first pipe shaft 58. The first rings 36 are preferably formed of steel, stainless steel, carbon steel material, or other materials, or combinations of metal materials, and are welded to the exterior surface of the first pipe shaft 58. A plurality of second rings 38 are regularly spaced along and extend perpendicularly outwardly from the exterior surface of the second pipe shaft 60. The second rings 38 are preferably formed of steel, stainless steel, carbon steel material, or other metal materials, or combinations of materials, and are welded to the exterior surface of the second pipe shaft 60.

In at least one embodiment, the first main shaft 52 extends outwardly from the first pipe shaft 58 proximate to the left side wall 46. The first main shaft 52 in addition passes through the opening 50 and through the left side wall 46. The first main shaft 52 also extends outwardly from the first pipe shaft 58 proximate to the right side wall 48. The first main shaft 52 in addition may be engaged to the opening 50 of the right side wall 48.

The second main shaft 54 extends outwardly from the second pipe shaft 60 proximate to the right side wall 48. The second main shaft 54 in addition passes through the opening 50 and through the right side wall 48. The second main shaft 54 also extends outwardly from the second pipe shaft 60 proximate to the left side wall 46. The second main shaft 54 in addition may be engaged to the opening 50 of the left side wall 46.

The first drive system 28 is engaged to the first end 62 of the first main shaft 52 exterior of the left side wall 46. The second end 64 of the first main shaft 52 is also engaged to a bushing and/or bearing mechanism proximate to the opening 50 of the right side wall 48 in order to permit friction free rotation relative to the right side wall 48. The second drive mechanism 30 is engaged to the first end 62 of the second main shaft 54 exterior of the right side wall 48. The second end 64 of the second main shaft 54 is also engaged to a bushing and/or bearing mechanism proximate to the opening 50 in the left side wall 46 permitting friction free rotation relative to the left side wall 46.

In at least one alternative embodiment, first the first main shaft 52 and the first pipe shaft 58, as well as the second main shaft 54 and the second pipe shaft 60 are not required to be at an identical elevation upwardly above the open bottom 22 of the carton reducer 10. In at least one embodiment, either the first main shaft 52 and the first pipe shaft 58, or the second main shaft 54 and second pipe shaft 60 may be slightly elevated relative to each other in order to facilitate the reduction and recycling of cardboard, plastic and/or food. It should be noted that in any embodiment, where either the first main shaft 52 and/or the second main shaft 54 is elevated relative to the other, then the respective pair of openings 50 and/or lap over rings 56 will likewise be elevated.

In at least one embodiment the first main shaft 52 and first pipe shaft 58, as well as the second main shaft 54 and second pipe shaft 60, are formed of steel, stainless steel, carbon steel, other metal materials, other materials, composite materials or combinations of the materials identified herein, provided that the features and functions identified do not fracture or fail during use of the carton reducer 10.

In at least one embodiment, the first main shaft 52 as well as the second main shaft 54 have an overall length dimension of approximately 101 and ¼ Inches. In other embodiments the length dimension for the first main shaft 52 and the second main shaft 54 may be larger or smaller than 101 and ¼ Inches dependent upon the overall size of the carton reducer 10.

In the preferred embodiment each of the first main shaft 52 and second main shaft 54, each have a first end 62 and a second and 64. The second end 64 of the first main shaft 52 is positioned proximate to the first end 62 of the second main shaft 54. The first main shaft 52 is at a 180° opposite orientation relative to the second main shaft 54. In other embodiments the first ends 62 of the first main shaft 52 and second main shaft 54 may be proximate to each other on either the left side wall 46 or right side wall 48.

In a preferred embodiment, the first ends 62 of the first main shaft 52 and second main shaft 54 are each engaged to the respective first drive system 28 and second drive system 30. The first drive system 28 is proximate and exterior to the left side wall 46 and the second drive system 30 is proximate and exterior to the right side wall 48.

The first ends 62 of the first main shaft 52 and the second main shaft 54 each have a length dimension of approximately 30.625 inches. The first ends 62 include an interior portion having a diameter of approximately 5.44 inches and an exterior portion having a length dimension of approximately 22 inches and a diameter of approximately 4.44 inches. The end of the exterior portion may also include a slot having a length dimension of approximately 13 inches.

The first ends 62 of the first and second main shafts 52, 54 preferably extend outwardly from the respective left side wall 46 and right side wall 48 to engage the first drive system 28 and the second drive system 30.

In another embodiment, the second ends 64 of the first and second main shafts 52, 54 are each engaged to a bushing or bearing mechanism located proximate and in contact with an opening 50 of the respective right side wall 48 and left side wall 46. The second ends 64 of the first and second main shafts 52, 54 each may have an interior portion having a diameter of 5.44 inches and an exterior portion having a diameter of 4.44 inches. The length of the interior portion may be approximately 6.65 inches and the length of the exterior portion may be approximately 8 inches.

In at least one embodiment, the first and second main shafts 52, 54 each include a central section having a diameter dimension of approximately 5.75 inches and a length dimension of approximately 56 inches.

It should be noted that the dimensions identified for the central sections of the first and second main shafts 52, 54 as well as the interior portions and exterior portions of the first and second ends 62, 64 may be increased or decreased in width, diameter and/or length dependent upon the size of the first and second main shafts 52, 54 as well as the overall size of the housing 40 and carton reducer 10.

In at least one preferred embodiment, the first pipe shaft 58 is disposed in surrounding engagement over the first main shaft 52. In addition, the second pipe shaft 60 is disposed in surrounding engagement over the second main shaft 54. The first main shaft 52 and second main shaft 54 function as the longitudinal axis of rotation for the respective first pipe shaft 58 and second pipe shaft 60.

Figure 6:
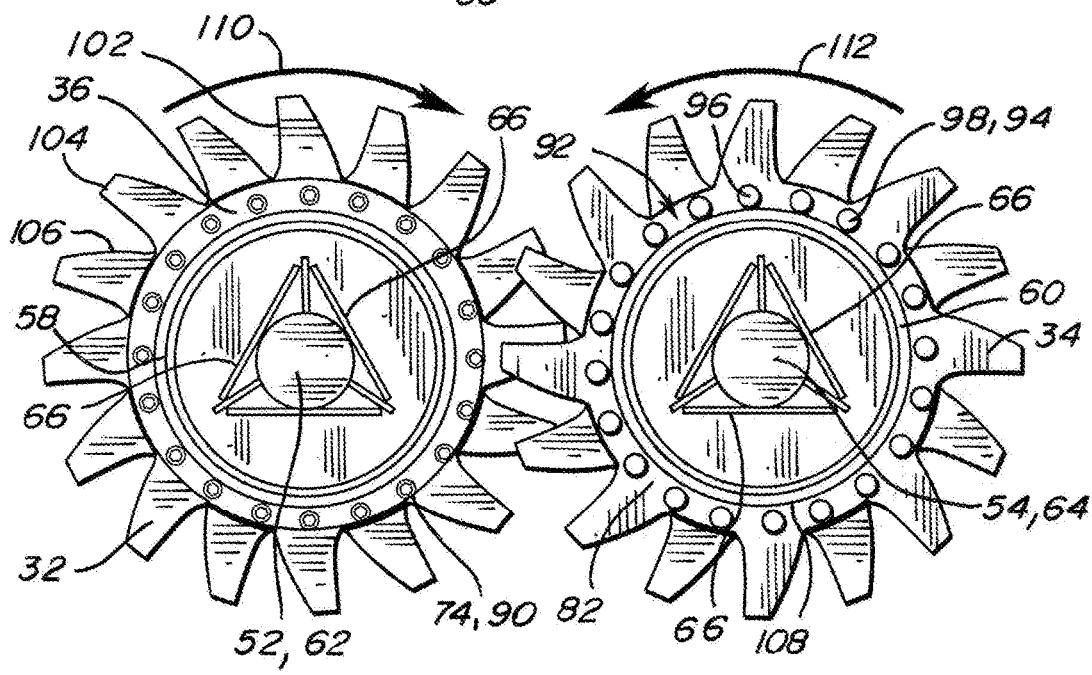
FIG. 6 is a detail partial side elevation view of the pipe shafts and teeth of the carton reducer/bag opener invention.

As may be seen in FIG. 6, the interior of the first pipe shaft 58 is attached to the first main shaft 52 through the use of a plurality of frame members 66. Frame members 66 may be welded to the central section of the first main shaft 52 and the interior wall of the first pipe shaft 58. The interior of the second pipe shaft 60 is attached to the second main shaft 54, through the use of a plurality of frame members 66. Frame members 66 may be welded to the central section of the second main shaft 54 and interior wall of the second pipe shaft 60.

In at least one preferred embodiment, each of the first pipe shaft 58 and second pipe shaft 60 are formed of steel, stainless steel, carbon steel, other metal materials, or other materials including composite materials, as well as combinations of the materials as identified, provided that the features and functions described herein do not fracture or fail during use of the carton reducer 10.

In at least one preferred embodiment, the first pipe shaft 58 as well as the second pipe shaft 60 are substantially cylindrical in shape having a diameter dimension of between 13 inches and 20 inches. In at least one embodiment the diameter dimension for the first and second pipe shafts 58, 60 is approximately 16 inches.

In at least one embodiment, each of the first pipe shaft 58 and second pipe shaft 60 have a first end 68 and a second end 70. In a preferred embodiment, the second end 70 of the first and second pipe shafts 58, 60 are located approximately 13.625 inches inwardly away from the tip of the second end 64 of the first and second main shafts 52, 54. The first ends 68 of the first and second pipe shafts 58, 60 are located approximately 29.625 inches inwardly away from the tip of the first end 62 of the first and second main shafts 52, 54.

In at least one embodiment, the frame members 66 when engaged to both the first and second main shafts 52, 54 as well as the interiors of the first and second pipe shafts 58, 60 form a triangular pyramid shape which may also function as a gear reducer for the first and second drive systems 28, 30. In at least one embodiment the frame members 66 may be located proximate to the first ends 62 of the first and second main shaft 52, 54.

In at least one embodiment, a fixed end cap 72 may be disposed over and connected to the second ends 64 of the first and second main shafts 52, 54. The fixed end cap 72 may also be at least partially inserted within the second ends 70 of the first and second pipe shafts 58, 60 acting as a plug, and/or alignment and support device relative thereto. It should be noted that the first and second main shafts 52, 54 may pass through the center of the fixed end caps 72 to engage either the belt drive or the bushing/bearing mechanism at the opposite sides of the housing 40.

In at least one embodiment, a fixed end cap 72 may be disposed over and connected to the first ends 62 of the first and second main shafts 52, 54. The fixed end caps 72 may also be at least partially inserted into the first ends 68 of the first and second pipe shaft 58, 60 acting as a plug and/or alignment and support device relative thereto. The first and second main shafts 52, 54 may pass through the center of the fixed end caps 72. In at least one embodiment, the frame members 66 are positioned proximate to the interior edge of the fixed end caps 72 which in turn are proximate to the first ends 68 of the first and second pipe shafts 58, 60, as well as the first ends 62 of the first and second main shafts 52, 54.

In at least one alternative embodiment, the first and second rings 36, 38 are affixed to the exterior and extend perpendicularly outwardly from the first and second pipe shafts 58, 60 respectively. The first and second rings 36, 38 are formed of steel, stainless steel, carbon steel, or other metal materials, or other materials including composite materials, and combinations of materials as identified herein, provided that the features and functions as identified for the carton reducer 10 do not fracture or fail during use.

In at least one alternative embodiment, the first and second rings 36, 38 have an inner diameter of 16 inches for flush engagement and connection to the exterior surface of the cylindrical first and second pipe shafts 58, 60, without gaps or openings therebetween. The first and second rings 36, 38 are preferably welded to the exterior surface of the first and second pipe shafts 58, 60. The first and second rings 36, 38 each preferably have an outer diameter of 20.5 inches and a thickness dimension of 1 inch. It should be noted that the dimensions identified for the first and second rings 36, 38 may be increased or decreased dependent upon the types of materials to be processed within the carton reducer 10 and/or the size of the carton reducer 10 to be used by an individual. Each of the first and second rings 36, 38 preferably include a first ring surface 84 and a second ring surface 86.

In at least one embodiment, approximately twenty fastener openings 74 are centrally and equally spaced through the first and second rings 36, 38. Each of the second ring surfaces 86 of the fastener openings 74 include an enlarged portion 90 functioning as a counter-sink. A fastener shaped opening is preferably disposed through the center of each of the enlarged counter-sink portions 90. In some embodiments each of the fastener openings 74 through the first and second ring surfaces 84, 86 of the first and second rings 36, 38 are spaced approximately 18° apart from each other.

In at least one embodiment, the initial first or second rings 36, 38 on the first or second pipe shafts 58, 60 are located a distance of approximately 3.125 inches away from the first ends 68. The second ring surfaces 86 are preferably positioned proximate to the first ends 68 and the first ring surfaces 84 are preferably positioned distally relative to the first ends 68. The next or adjacent first or second rings 36 or 38 on the first or second pipe shafts 58, 60 are preferably located 4.75 inches inwardly from the second ring surface 86 of the initial ring 36, 38 on the first and second pipe shafts 58, 60. Initially, the distance between the second ring surface 86 and the first ring surface 84 of adjacent first rings 36 on the first pipe shaft 58 is approximately 3.75 inches. The space or gap between adjacent rings 36, 38 on the first and second pipe shafts 58, 60 is therefore approximately 3.75 inches. The gap is referred to by arrow 76 of FIG. 4. The first rings 36 are regularly spaced along the exterior surface of the first pipe shaft 58 and the second rings 38 are regularly spaced along the exterior of the surface of the second pipe shaft 60. In at least one embodiment, each adjacent ring has a distance between the first ring surface 84 of an initial ring and the second ring surface 86 of an adjacent ring of approximately 3.75 inches.

In at least one embodiment, twelve first rings 36 may be engaged to the exterior of the first pipe shaft 36 and approximately twelve second rings 38 will be engaged to the exterior of the second pipe shaft 60.

Figure 5:
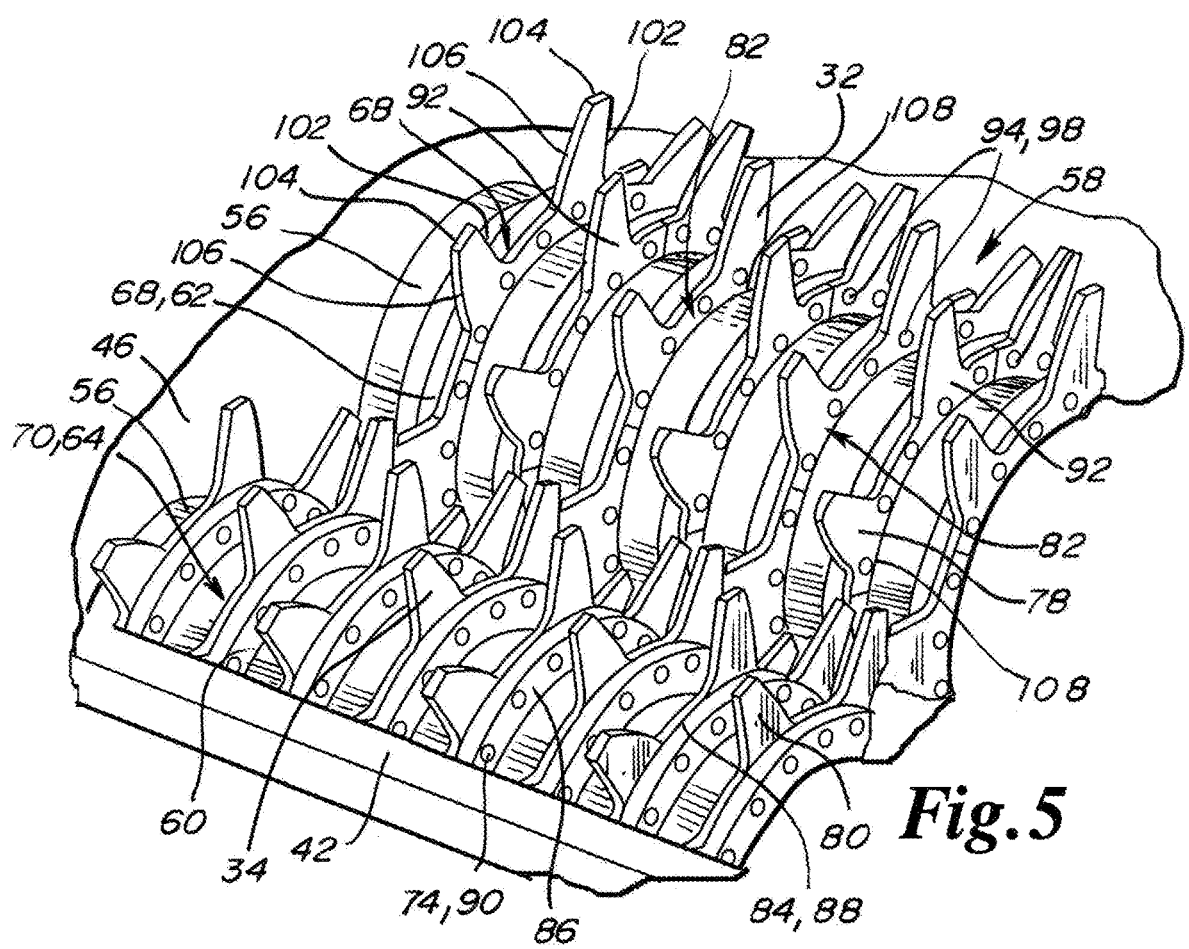
FIG. 5 is a detail partial isometric perspective view of one alternative embodiment of the rotating pipe shafts and teeth of the carton reducer/bag opener invention.

In at least one preferred embodiment, the first teeth 32 are integral to a first tooth plate 78 and the second teeth 34 are integral to a second tooth plate 80. The first and second tooth plates 78, 80 each preferably include an arcuate lower edge 108 which is sized for flush engagement to the exterior surface of the first and second pipe shafts 58, 60 respectively, without creating any gaps or spaces therebetween. Each of the first and second tooth plates 78, 80 include a lower structural area 82. Each of the lower structural areas 82 include a first tooth plate surface 88 which is positioned proximate to the first ring surfaces 84 of the first and second rings 36, 38. The second tooth plate surfaces 92 are preferably positioned distally relative to the first ring surfaces 84 of the first and second rings 36, 38. (FIG. 5 and FIG. 7)

Each of the first and second tooth plates 78, 80 include a plurality of plate fastener openings 94. Each of the plate fastener openings 94 are spaced and disposed for alignment with one of the fastener openings 74 of the first and second rings 36, 38. Each of the plate fastener openings 94 preferably include an enlarged plate opening portion 98. The enlarged plate opening portion 98 is constructed and arranged function as a counter-sink for a fastener 96 which is used to releasably secure the first tooth plate 78 to a first ring 36 and a second tooth plate 82 a second ring 38.

In at least one embodiment, the enlarged portions 90 of the second ring surfaces 86 in conjunction with the enlarged plate opening portion 98 on the second tooth platform surface 92 enable the ends of fastener 96 to be disposed interior to, or below, the second ring surface 86 and to the interior or below the second tooth plate surface 92. The counter-sink positioning of the ends of fastener 96 below the second ring surface 86 removes structure which may engage plastic or other material reducing the winding of shredded material around the first and second pipe shafts 58, 60 during rotation and use of the carbon reducer 10. For example, if the fastener 96 is a bolt and nut, then the head of the fastener 96 may be disposed interior to the surface of the second tooth platform surface 92. The nut of the fastener 96 may be disposed to the interior of the second ring surface 86. Therefore, the head and nut of fastener 96 will not function as structure extending outwardly past either of the second tooth platform surface 92 or the second ring surface 86 which may snag material to be reduced during the use of the carton reducer 10.

In at least one embodiment, a plurality of first tooth plates 78 are disposed adjacent to each other, end to end, to completely encircle the first pipe shaft 58 proximate to a first ring 36. In some embodiments, four, first tooth plates 78 may be used to encircle the first pipe shaft 58. In addition, a plurality of second tooth plates 80 are disposed adjacent to each other, end to end, to completely encircle the second pipe shaft 60 proximate to a second ring 38. In some embodiments, four, second tooth plates 80 may be used to encircle the second pipe shaft 60.

In other embodiments, two or more first tooth plates 78 may encircle the first pipe shaft 58 while five or more second tooth plates 80 may encircle the second pipe shaft 60. It should be noted that any number of first tooth plates 78 may be used on the first pipe shaft 58. The number of first tooth plates 78 may be identical to the number of second tooth plates 80 used on the second pipe shaft 60. Alternatively, the number of first tooth plates 78 on the first pipe shaft 58 may be larger or smaller than the number of second tooth plates 80 used on the second pipe shaft 60.

In a preferred embodiment, each of the first and second tooth plates 78, 80 preferably include at least one, and preferably a plurality of first or second teeth 32, 34 respectively.

In at least one embodiment, the first tooth plate surfaces 88 of the first and second tooth plates 78, 80 are releasably secured to the first surfaces 84 of the first and second rings 36, 38. The first tooth plate surfaces 88 being positioned adjacent to, interior, and in contact with, the first ring surfaces 84 on the first and second rings 36, 38.

The second tooth plate surfaces 92 and the second ring surfaces 86 are positioned to the exterior of each releasably joined pair of first or second rings 36, 38 and first or second tooth plates 78, 80. The enlarged countersink portion 90 of the first and second rings 36, 38 and the enlarged plate opening portions 98 of the first and second tooth plates 78, 80 are opposite to each other and are positioned toward a gap between pairs of rings and tooth plates on the first and second pipe shafts 58, 60. In this embodiment the separation distance or gap between the second tooth plate surface 92 and a first tooth plate surface 88 on an ring is approximately 4.25 inches.

In at least one embodiment each of the first and second teeth 32, 34 have a thickness dimension of between ⅜ and ¾ inches, and is preferably ½ inch. The gap or separation distance between adjacent first tooth plates 78 on the first pipe shaft 58 and the gap between the second tooth plates 80 on the second pipe shaft 60 is identified by arrow 100 on FIG. 4.

It should be noted that the separation distance between adjacent first tooth plates 78 on the first pipe shaft 58 is not required to be equal to the separation distance between second tooth plates 80 on the second pipe shaft 60. However, in a preferred embodiment, the second teeth 34 on the second pipe shaft 60 are offset relative to the first teeth 32 of the first pipe shaft 58, where the second teeth 34 are positioned in the gap 76 between adjacent first teeth 32. Likewise, first teeth 32 are offset relative to adjacent second teeth 34 on the second pipe shaft 60 where the first teeth 32 are disposed in the gap 100 between the second teeth 34.

In at least one embodiment the number of first tooth plates 78 on first rings 36 is not required to be equal to the number of second tooth plates 80 on the second rings 38. The number of first rings 36 and corresponding number of first tooth plates 78 may be increased or decreased along the length of the first pipe shaft 58 dependent upon the materials and/or food items to be reduced by carton reducer 10. Likewise, the number of second rings 38 on second tooth plates 80 may be increased or decreased along the length of second pipe shaft 60 dependent on the materials and/or food items to be reduced by carton reducer 10. For example, the first pipe shaft 58 may in one embodiment include twelve first rings 36 and twelve sets of first tooth plates 78. Simultaneously, the second pipe shaft 80 may include six or eight second rings 38 and six or eight sets of second tooth plates 80.

In at least one embodiment, during set up of the carton reducer 10, the spacing between adjacent first rings 36 of first teeth 32 may be increased or decreased. Likewise, the spacing between adjacent second rings 38 of second teeth 34 may be increased or decreased. Further, the spacing between each of the first teeth 32 on each individual first ring 36 may be increased or decreased, and the spacing between each of the second teeth 34 on each individual second ring 38 may be increased or decreased to enlarge or reduce the size of the processed cartons, container bags and the individually packaged food items.

It should be noted that the dimensions provided herein for the first and second tooth plates 78, 80 may be increased or decreased at the discretion of an individual dependent upon the materials to be reduced and/or the size of the carton reducer 10.

In a preferred embodiment, the first the second tooth plates 78, 80 are preferably formed of steel, stainless steel, carbon steel, other metal materials, other materials, composite materials or combinations of the materials identified herein, provided that the features and functions as identified do not fracture or fail during use of the carton reducer 10 in the reduction of cardboard packaging, plastic packages and/or food items.

In at least one embodiment, as shown in FIGS. 5 and 6, the first teeth 32 and second teeth 34 in general have the shape of a shark fin. Each of the first teeth 32 and second teeth 34 have a substantially vertical edge 102 extending upwardly/outwardly from the lower structural area 82. The substantially vertical edge 102 terminates in a substantially horizontal edge 104 which in some embodiments may have a length dimension of approximately 1 and ½ inches. In other embodiments, the length of horizontal edge 104 may be larger or smaller than 1 and ½ inches At the preference of an individual. In at least one embodiment, an arcuate edge 106 descends from the horizontal edge 104 opposite to the vertical edge 102. The arcuate edge 106 transitions into the lower structural area 82 defining a first or second tooth 32, 34.

In some embodiments, the horizontal edge 104 is approximately 6 and ⅜ inches above the bottom arcuate edge 108 and is approximately 4 and ¾ inches above the upper edge of the lower structural area 82. It should be noted that the height of the upper horizontal edge 104 for the first and second teeth 32, 34 above the bottom arcuate edge 108 may be larger or smaller than 6 and ⅝ inches dependent on materials to be processed in the carton reducer 10 or the overall size of the carton reducer 10.

In other embodiments, the height dimension of the horizontal edge 104 above the bottom arcuate edge 108 is not required to be identical for the first teeth 32 relative to second teeth 34, which may have a larger or smaller height dimension at the preference of an individual. In addition, the height dimension of the horizontal edge 104 above the bottom arcuate edge 108 is not required to be identical for all of the first teeth 32 on any single first ring 36. For example, every other of the first teeth 32 on one of the first rings 36 may have the same or a different height dimension at the preference of an individual. Further, adjacent first rings 36 are not required to have first teeth 32 having the same height dimension where an adjacent first rings 36 may have first teeth 32 having a height dimension which is either larger or smaller than another first ring 36. In at least one embodiment, any one or more first teeth 32 on any one or more first rings 36 may have a height dimension which is identical or different from the height dimension of any other first teeth 32 on the first pipe shaft 58. In some embodiments, the first teeth 32 are arranged into a combination or pattern of heights on the first pipe shaft 58.

In general it is anticipated that the height dimension between the horizontal edge 104 and a bottom arcuate edge 108 will vary between 1 and ½ inches to 8 inches in dimension, for any one or more of the first teeth 32 and/or second teeth 34.

In at least one embodiment, the height dimension of the horizontal edge 104 above the bottom arcuate edge 108 is not required to be identical for all of the second teeth 34 on any single second ring 38. For example, every other of the second teeth 34 on one of the second rings 38 may have the same or a different height dimension at the preference of an individual. Further, adjacent second rings 38 are not required to have second teeth 34 having the same height dimension. Adjacent second rings 38 may have second teeth 34 having a height dimension which is either larger or smaller than another second ring 38. In at least one embodiment, any one or more second teeth 34 on any one or more second rings 38 may have a height dimension which is identical or different from the height dimension of any other second teeth 34 on the second pipe shaft 60. In some embodiments, the second teeth 34 are arranged into a combination or pattern of heights on the second pipe shaft 60.

In at least one embodiment, each first tooth plate 78 includes two first teeth 32. In this embodiment, the distance between the vertex of the top horizontal edge 104 and the arcuate edge 106 of the initial first tooth 32 and the vertex of the top horizontal edge 104 and the vertical edge 102 of an adjacent first tooth 32 is approximately 10 and ¹⁄₁₆ inches. In other embodiments the separation distance between adjacent first teeth 32 on a first tooth plate 78 may be larger or smaller than 10 and ¹⁄₁₆ inches at the discretion of an individual.

In other embodiments a first tooth plate 78 may include three or more first teeth 32. In this embodiment, the distance between the vertex of the top horizontal edge 104 and the arcuate edge 106 of an initial first tooth 32 and the vertex of the top horizontal edge 104 and the vertical edge 102 of the third or separated first tooth 32 is approximately 10 and ¹⁄₁₆ inches. It should be noted that the first tooth plates 78 may include any number of first teeth 32 as desired by an individual which may be dependent upon the materials to be reduced or the size selected for the carton reducer 10.

In at least one embodiment, a second tooth plate 80 includes two second teeth 34. In this embodiment the distance between the vertex of the top horizontal edge 104 and the arcuate edge 106 of an initial second tooth 34, and the vertex of the top horizontal edge 104 and the vertical edge 102 of an adjacent second tooth 34, is approximately 10 and ¹⁄₁₆ inches. In other embodiments, the separation distance between adjacent second teeth 34 on a second tooth plate 80 may be larger or smaller than 10 and ¹⁄₁₆ inches at the discretion of an individual.

In other embodiments, a second tooth plate 80 may include three or more second teeth 34. In this embodiment, the distance between the vertex of the top horizontal edge 104 and the arcuate edge 106 of an initial second tooth 34 and the vertex of the top horizontal edge 104 and the vertical edge 102 of the third or separated second tooth 34, is approximately 10 and ¹⁄₁₆ inches. It should be noted that the second tooth plate 80 may include any number of second teeth 34 as desired by an individual which may be dependent upon the materials to be reduced and the size selected for the carton reducer 10.

In at least one embodiment, the first tooth plate 78 as releasably engaged to any of the first rings 36 may include any desired number of first teeth 32. For example, in one embodiment four, first tooth plates 78 each having two, first teeth 32 may be secured to a single first ring 36. An adjacent first ring 36 may have four, first tooth plates 78, each having three or more first teeth 32. Further, another first ring 36 may include four, first tooth plates 78, were each of the first tooth plates 78 alternate between the inclusion of two first teeth 32 and three first teeth 32.

In another alternative embodiment, a first ring 36 may include three, first tooth plates 78 which encircle the first pipe shaft 58, and each of the first tooth plates 78 include four, first teeth 32. It should be noted that any number of first tooth plates 78, where each first tooth plate 78 has a desired number of first teeth 32, may be secured to any number of first rings 36 on the first pipe shaft 58. Each of the plurality of first rings 36 may include an identical number of first tooth plates 78, or a different number of first tooth plates 78. In addition, each of the plurality of first tooth plates 78 may include an identical number and size of first teeth 32. Alternatively, any number or combination of first tooth plates 78 may include a different number or size of first teeth 32.

In certain embodiments, the first tooth plates 78 are interchangeable to facilitate the provision of a desired combination or pattern of first teeth 32. The selection of a desired combination or pattern of the number and/or size of first teeth 32 on first rings 36 may vary dependent upon the materials to be processed and the size of the carton reducer 10.

In at least one embodiment, the second tooth plates 80 as releasably engaged to any of the second rings 38 may include any desired number of second teeth 34. For example, in one embodiment, four, second tooth plates 80, each having two second teeth 34, may be secured to a single second ring 38. An adjacent second ring 38 may have four, second tooth plates 80, each having three or more second teeth 34. Further, another second ring 38 may include four, second tooth plates 80, where each of the second tooth plates 80 alternate between the inclusion of two, second teeth 34 and three, second teeth 34.

In another alternative embodiment, a second ring 38 may include three, second tooth plates 80 which encircle the second pipe shaft 60 and each of the second tooth plates 80 include four second teeth 34. It should be noted that any number of second tooth plates 80, where each second tooth plate 80 has a desired number of second teeth 34, may be secured to any number of second rings 38 on the second pipe shaft 60. Each of the plurality of second rings 38 may include an identical number of second tooth plates 80. Alternatively, each of the second rings 36 may include the same or a different number of second tooth plates 80. In addition, each of the plurality of second tooth plates 80, may include an identical number and size of second teeth 34. Alternatively, any number or combination of second tooth plates 80 may include the same or a different number or size of second teeth 34. In certain embodiments, the second tooth plates 80 are interchangeable to facilitate the provision of a desired combination or pattern of second teeth 34. The selection of a desired combination or pattern of the number and/or size of second teeth 34 on second rings 38 may vary dependent on the materials to be processed and the size of the carton reducer 10.

It should be noted that the number of first and/or second tooth plates 78, 80 as used on the first and second pipe shaft 58, 60 respectively, may be individually adjusted and may be configured into any desired profile to maximize processing of materials through the carbon reducer 10, while simultaneously minimizing the wrapping of plastic or other packaging materials around either the first or second pipe shafts 58, 60.

In addition, the number of first and/or second teeth 32, 34 as incorporated into each of the first and second tooth plates 78, 80 respectively, may be individually increased or decreased in number and/or size and may be configured into any desired combination profile to maximize the processing of materials through the carton reducer 10 while simultaneously minimizing the wrapping of plastic or other packaging materials around either of the first or second pipe shafts 58, 60.

Further, the number of first and/or second rings 36, 38 which releasably receive the first and second tooth plates 78, 80 respectively, may be increased or decreased and may be configured into any desired combination profile to maximize processing of material through the carbon reducer 10, while simultaneously minimizing the wrapping of plastic or other packaging materials around either of the first or second pipe shafts 58, 60.

As may be seen in FIG. 5 and FIG. 6, the first teeth 32 on adjacent first rings 36 on the first pipe shaft 58 are not required to be aligned relative to each other longitudinally along the length of the exterior of the first pipe shaft 58, and may be offset relative to each other to form a desired combination. For example, in one embodiment, the first teeth 32 on every other first ring 36 on the first pipe shaft 58 may be aligned relative to each other longitudinally along the length of the exterior of the first pipe shaft 58. In this embodiment, an aligned space or gap will be present between adjacent first teeth 32 on every other first ring 36. An intermediate first ring 36, located between every other first ring 36, may centrally position first teeth 32 in the gap or space established between the first teeth 32 on every other first ring 36. In this configuration first teeth 32 will be disposed in an alternating configuration to fill any gap or space between first teeth 32 on an adjacent first ring 36. In other embodiments, the space between first teeth 32 on a first ring 36 may be filled with two, three, or four or more first teeth 32 on adjacent and consecutive second, third, or fourth or more first ring 36 in any alternating or aligned configuration. In one embodiment, the alignment of the first teeth 32 on adjacent first rings 36 longitudinally along the length of the exterior of the first pipe shaft 58 may be disposed in the shape of a spiral.

As may be seen in FIG. 5 and FIG. 6, the second teeth 34 on adjacent second rings 38 on the second pipe shaft 60 are not required to be aligned relative to each other longitudinally along the length of the exterior of the second pipe shaft 60, and may be offset relative to each other to form a desired combination. For example, in one embodiment, the second teeth 34 on every other second ring 38 on the second pipe shaft 60 may be aligned relative to each other longitudinally along the length of the exterior of the second pipe shaft 60. In this embodiment, an aligned space or gap will be present between adjacent second teeth 34 on every other second ring 38. An intermediate second ring 38, located between every other second ring 38, may centrally position second teeth 34 in the gap or space established between the second teeth 34 on every other second ring 38. In this configuration second teeth 34 will be disposed in an alternating configuration to fill any gap or space between second teeth 34 on an adjacent second ring 38. In other embodiments, the space between second teeth 34 on a second ring 38 may be filled with two, three, or four or more second teeth 34 on adjacent and consecutive second, third, or fourth or more second rings 38 in any alternating or aligned configuration. In one embodiment, the alignment of the second teeth 34 on adjacent second rings 38 longitudinally along the length of the exterior of the second pipe shaft 60 may be disposed in the shape of a spiral.

In at least one embodiment, the first and second drive systems 28, 30 each include a motor engaged to a wheel, and a belt engaged to the wheel and to the first ends 62 of the first and second main shafts 52, 54. The first and second drive systems 28, 30 in at least one embodiment are belt drive systems. The first and second drive systems 28, 30 may be engaged to shaft seals 118. Shaft seals 118 may also be engaged to the respective left side wall 46 and right side wall 48. (FIG. 10)

In at least one embodiment, each of the first and second drive systems 28, 30 include a controller providing variable frequency drive for each of the belt drive systems. In at least one embodiment, the controller may be a programmable logic controller.

In some embodiments, a controller will be in communication with a control panel which in turn is in communication with either the first drive system 28 or the second drive system 30. It should be noted that the variable frequency drive for each of the first drive system 28 and second drive system 30 may be set to regulate a desired frequency of rotation for the first main shaft 52 and first pipe shaft 58 as well as the second main shaft 54 and the second pipe shaft 60. It should be noted that in a preferred embodiment the frequency of rotation of the first main shaft 52 and first pipe shaft 58 will not be the same, and will be different in the frequency from the rate of rotation for the second main shaft 54 and the second pipe shaft 60.

In at least one embodiment, the motors for the first drive system 28 and second drive system 30 will each be a 20 HP TEFC 3 ph/480 v/60 hz and the controllers may be Allen Bradley PowerFlex® variable frequency drives.

In at least one embodiment, the first and second drive systems 28, 30 will each include a heavy duty gear reducer available from Dodge®.

In at least one embodiment the 20 HP variable frequency drives will include keypads providing start-stop and speed control functionality for the rotation of the first main shaft 52 and first pipe shaft 58 as well as the second main shafts 54 and second pipe shaft 60. The first and second drive system 28, 30 may receive power from a 480V direct current power source. Other features of the first and second drive systems 28, 30 include, but are not necessarily limited to, the use of a main disconnect having a lockable handle; a raised, illuminated E-stop and relay; a reversible, cycle timer, an analog surface hour meter; and a light stack with red, red flashing and green indicators.

In at least one embodiment, the first drive system 28 is located proximate and to the exterior to the left side wall 46. The second drive system 30 is located proximate and exterior to the right side wall 48.

In the preferred embodiment, the first and second drive system 28, 30 rotate the first main shaft 52 and first pipe shaft 58 as well as the second main shaft 54 and second pipe shaft 60 in an inboard direction where the upper portions of the first teeth 32 and second teeth 34 are rotating towards each other to facilitate the positioning of material to be reduced between the first pipe shaft 58 and second pipe shaft 60. In at least one embodiment the inboard rotation of the first pipe shaft 58 and the second pipe shaft 60 is depicted in FIG. 6 where the direction of rotation of the first main shaft 52 and first pipe shaft 58 is represented by arrow 110. The direction of rotation of the second main shaft 54 and the second pipe shaft 60 is represented by arrow 112.

In at least one embodiment, the first drive system 28 may be rotating the first main shaft 52, the first pipe shaft 58, and the first teeth 32 at a higher frequency or faster rate of rotation as compared to the second drive system 30, second main shaft 54, second pipe shaft 60 and second teeth 34.

In at least one embodiment, the ratio of the frequency of rotation of the fast main shaft and pipe shaft relative to the frequency of rotation of the slow main shaft and pipe shaft is equal to or above 1 to 1 and equal to or below 7.5 to 1, dependent upon the material to be reduced by the carton reducer 10.

In at least one embodiment, the first main shaft 52 and first pipe shaft 58 is rotating three times faster than the frequency of rotation of the second main shaft 54 and second pipe shaft 60.

In at least one alternative embodiment, the variable frequency drive including the programmable logic controller of the first drive system 28 will rotate the first main shaft 52 and the first pipe shaft 58 at a higher frequency of rotation as compared to the second drive system 30, second main shaft 54 and second pipe shaft 60.

The programmable logic controller of the first drive system 28 will maintain the set frequency of rotation for a desired duration of time, which may be equal to and between one minute and up to 60 minutes, depending on the contamination level of product to be reduced in the carton reducer 10.

In this embodiment, the programmable logic controller will be used to set the second drive system 30 to rotate the second main shaft 54 and second pipe shaft 60 at a reduced frequency of rotation for the identical period of time.

At the expiration of the desired period of time, the first drive system will automatically re-adjust the frequency of rotation of the first main shaft 52 and first pipe shaft 58 to the slower frequency of rotation previously set for the second drive system 30. Simultaneously, the programmable logic controller of the second drive system 30 will increase the frequency of rotation of the second main shaft 54 and second pipe shaft 62 upwardly to the rate of rotation previously used by the first drive system 28.

The first and second drive system 28, 30 will then rotate the respective main shaft and pipe shafts at the adjusted and exchanged rate of rotation for the set period of time.

At the expiration of the set period of time, the programmable logic controller may reset the first and second drive systems 28, 30 to new rotational rates as desired by an individual. Alternatively, an individual may initiate a repeat of the previous timed cycle of adjustable frequencies of rotation for the first and second main shaft 52, 54, as well as the first and second pipe shaft 58, 60.

It should be noted that the rotation of either the first main shaft 52 and first pipe shaft 58 or the second main shaft 54 and second pipe shaft 60 may be increased or decreased into a new, reset, or exchanged rotational frequency in a period of time of approximately five seconds or less.

In at least one alternative embodiment, the first drive system 28 or second drive system 30 may establish a speed of rotation of 20 RPM at 60 HZ. The first drive system 28 and second drive system 30 may operate in a range equal to or between 10 HZ and 80 HZ resulting in a range of speeds of rotation between 3.5 RPM and 26.5 RPM. In at least one embodiment, the carton reducer 10 processes and reduces cartons, packaging, individual packages and food items at a rate of between 10 and 20 tons of material per hour.

In at least one alternative embodiment, the housing 40 may be formed of three-quarter inch steel, stainless steel and/or carbon steel or other metallic materials, non-metallic materials, composite materials and combinations of materials identified herein, provided that the features and attributes as identified do not fail during use of the carton reducer 10.

Figure 11:
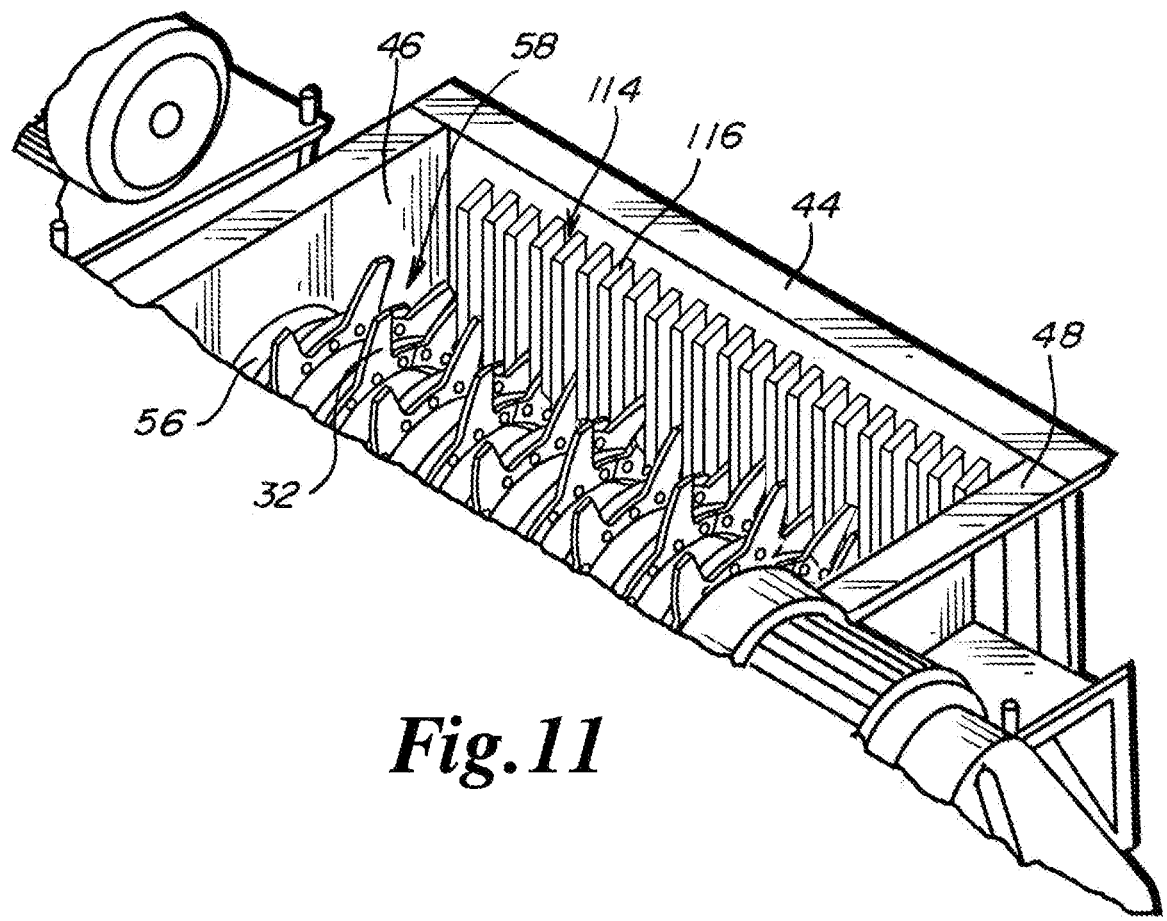
FIG. 11 is a detail partial isometric perspective view of one embodiment of a rear side wall of a housing having stripper bars of the carton reducer/bag opener invention.

In some embodiments, at least one of the front side wall 42 and the rear side wall 44 may include a stripper bar 114 as shown in FIG. 11. Stripper bar 114 may be formed of a plurality of vertically disposed and parallel bars 116. In at least one embodiment, either the first teeth 32, the second teeth 34 and/or both the first teeth 32 and second teeth 34 are positioned for alignment within a gap between adjacent bars 116. The first and second teeth 32, 34 during rotation will vertically enter the lower gaps between adjacent bars 116 rotating upwardly, and will continue to rotate upwardly towards the center of the hopper 12, and then will rotate downwardly towards the open bottom 22, before ascending upwardly for another revolution. The bars 116 function as additional structure to facilitate the reduction of materials processed by carton reducer 10 into a desired size. In at least one embodiment, where the size of the reduced materials is desired to be small, then the optional stripper bars 114 may be added to one or both of the front side wall 42 and/or the rear side wall 44 within the interior of the carton reducer 10.

In at least one embodiment, the use of the first and second rings 36, 38 as well as the fasteners 96 enable an individual to selectively replace one or a number of first and second tooth plates 78, 80 within the carton reducer 10. The replacement of first or second tooth plates 78, 80 may individually include an increased or decreased number of first and second teeth 32, 34. Alternatively, the first and second teeth 32, 34 may be increased or decreased in size. Furthermore, the first and second teeth 32, 34 may have an alternative shape to provide a desired customized profile for use in reducing material and/or food items. The size, shape, and number of first and second teeth 32, 34 on the first and second tooth plates 78, 80 may be selected to minimize the wrapping of shredded material around the first or second pipe shafts 58, 60, as dependent on the packaging and materials be reduced. In addition, the programmable logic controller for the first and second drive system 28, 30 may be adjusted and/or set to a frequency of rotation, to minimize the wrapping of shredded packaging or materials about one or more of the first and second pipe shaft 58, 60.

In at least one embodiment, the use of first and second pipe shaft 58, 60 having the increased diameter dimension as identified herein reduces the wrapping of shredded packaging and/or materials about the first and second pipe shaft 58, 60 during use of the carton reducer 10.

In addition, the increased diameter for the first and second pipe shafts 58, 60 reduces material throughput during use of the carton reducer 10 further reducing undesirable wrapping of materials about the first and second pipe shafts 58, 60.

In at least one embodiment, the lap over rings 56 are located on opposite ends of the first and second pipe shafts 58, 60 and are positioned exterior to the ends of the first and second pipe shafts 58, 60, reducing the wrapping of shredded packaging and/or materials about the first and second pipe shaft 58, 60 during use of the carton reducer 10.

In a first alternative embodiment the package reducing device includes a hopper having a left side wall, a right side wall, an interior, an exterior, a first lap over ring on the interior of the left side wall, a second lap over ring on the interior of the right side wall, a third lap over ring on the interior of the left side wall and a fourth lap over ring on the interior of the right side wall; a first main shaft traversing between the right side wall and the left side wall, the first main shaft being an axis of rotation for a first pipe shaft secured to the first main shaft in the interior of the hopper, the first pipe shaft having a first pipe shaft diameter dimension being larger than thirteen inches, the first pipe shaft having a first end and a second end, the first end being disposed interior to the first lap over ring and the second end being disposed interior to the second lap over ring, the first pipe shaft being substantially cylindrical in shape having a plurality of first rings, the plurality of first rings extending outwardly from the first pipe shaft, each of the plurality of first rings having a second ring surface, each of the second ring surfaces having a plurality of second recessed ring openings, each of the second recessed ring openings receiving a fastener, the second recessed ring openings being constructed and arranged to dispose the fastener below the second ring surface; a second main shaft traversing between the right side wall and the left side wall, the second main shaft being an axis of rotation for a second pipe shaft secured to the second main shaft in the interior of the hopper, the second pipe shaft having a second pipe shaft diameter dimension being larger than thirteen inches, the second pipe shaft having a third end and a fourth end, the third end being disposed interior to the third lap over ring and the fourth end being disposed interior to the fourth lap over ring, the second pipe shaft being substantially cylindrical in shape having a plurality of second rings, the plurality of second rings extending outwardly from the second pipe shaft, each of the plurality of second rings having the second ring surface, each of the second ring surfaces having a plurality of the second recessed ring openings, each of the second recessed ring openings receiving the fastener, the second recessed ring openings being constructed and arranged to dispose the fastener below the second ring surfaces; a plurality of first tooth plates, each of the first tooth plates having at least one first tooth, each of the first tooth plates being releasably secured to one of the first rings; a plurality of second tooth plates, each of the second tooth plates having at least one second tooth, each of the second tooth plates being releasably secured to one of the second rings; a first drive motor positioned to the exterior of the hopper, the first drive motor being engaged to the first main shaft, the first drive motor rotating the first main shaft and the first pipe shaft at a first rate of rotation and in a first direction of rotation; and a second drive motor positioned to the exterior of the hopper, the second drive motor being engaged to the second main shaft, the second drive motor rotating the second main shaft and the second pipe shaft at a second rate of rotation and a second direction of rotation, the second rate of rotation being slower than the first rate of rotation, the second direction of rotation being in an inboard direction relative to the first direction of rotation, wherein the at least one first tooth and the at least one second tooth reduce the size of packaging and food transported inside of the packaging upon placement of the packaging in the hopper and contact with the at least one first tooth and the at least one second tooth during rotation of the first main shaft and the second main shaft.

In a second alternative embodiment according to the first embodiment, the hopper further includes a front side wall, a rear side wall and an open bottom.

In a third alternative embodiment according to the second embodiment, the first lap over ring and the second lap over ring each have a first lap over ring diameter dimension which is larger than the first pipe shaft diameter dimension by ¼ inch, and the third lap over ring and the fourth lap over ring each have a second lap over ring diameter dimension which is larger than the second pipe shaft diameter dimension by ¼ inch.

In a fourth alternative embodiment according to the third embodiment, the first lap over ring is horizontally aligned with the second lap over ring and the third lap over ring is horizontally aligned with the fourth lap over ring.

In a fifth alternative embodiment according to the fourth embodiment, the plurality of first rings extend perpendicularly outward from the first pipe shaft and the plurality of second rings, extend perpendicularly outward from the second pipe shaft.

In a sixth alternative embodiment according to the fifth embodiment, the first rings have an inner first ring diameter dimension of 16 inches and an outer first ring diameter dimension of 20.5 inches.

In a seventh alternative embodiment according to the fifth embodiment, the second rings have an inner second ring diameter dimension of 16 inches and an outer second ring diameter dimension of 20.5 inches.

In an eighth alternative embodiment according to the fifth embodiment, at least two of the plurality of first rings on the first pipe shaft are adjacent to each other and are separated by a dimension of 4.25 inches.

In a ninth alternative embodiment according to the fifth embodiment, the at least two of the plurality of second rings on the second pipe shaft are adjacent to each other, and are separated by a dimension of 4.25 inches.

In a tenth alternative embodiment according to the fifth embodiment, the plurality of first rings and the plurality of second rings each have an exterior tooth plate surface.

In an eleventh alternative embodiment according to the tenth embodiment, each of the exterior tooth plate surfaces have a plurality of exterior tooth plate surface recessed openings, the exterior tooth plate surface recessed openings being constructed and arranged to receive the fastener, the fastener having ends, and to position at least one of the fastener ends below the exterior tooth plate surface.

In a twelfth alternative embodiment according to the fifth embodiment, each of the first tooth plates have at least two first teeth and each of the second tooth plates have at least two second teeth.

In a thirteenth alternative embodiment according to the fifth embodiment, at least two of the plurality of first tooth plates on the first pipe shaft are adjacent to each other and are separated by a dimension of 4.25 inches.

In a fourteenth alternative embodiment according to the fifth embodiment, at least two of the plurality of second tooth plates on the second pipe shaft are adjacent to each other, and are separated by a dimension of 4.25 inches.

In a fifteenth alternative embodiment according to the fifth embodiment, each of the first drive motor and the second drive motor include a variable frequency drive.

In a sixteenth alternative embodiment according to the fifth embodiment, the first rate of rotation and the second rate of rotation equal or exceed 3.5 RPM and are equal to or less than 26.5 RPM.

In a seventeenth alternative embodiment according to the fifth embodiment, the first rate of rotation is equal to or greater than 1 and equal to or less than 7.5 times faster than the second rate of rotation.

In an eighteenth alternative embodiment according to the fifth embodiment, at least one of the front side wall and the rear side wall have stripper bars.

In a nineteenth alternative embodiment according to the fifth embodiment, the first main shaft has a first main shaft end and a second main shaft end and the second main shaft has a third main shaft end and a fourth main shaft end, the first main shaft end traversing the left side wall and the third main shaft end traversing the right side wall.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

We claim:

1. A package reducing device comprising:
   a. a hopper having a left side wall, a right side wall, an interior, an exterior, a first lap over ring on said interior of said left side wall, a second lap over ring on said interior of said right side wall, a third lap over ring on said interior of said left side wall and a fourth lap over ring on said interior of said right side wall;
   b. a first main shaft traversing between said right side wall and said left side wall, said first main shaft being an axis of rotation for a first pipe shaft secured to said first main shaft in said interior of said hopper, said first pipe shaft having a first pipe shaft diameter dimension being larger than thirteen inches, said first pipe shaft having a first end and a second end, said first end being disposed interior to said first lap over ring and said second end being disposed interior to said second lap over ring, said first pipe shaft having a plurality of first rings, said plurality of first rings extending outwardly from said first pipe shaft, each of said plurality of first rings having a second ring surface, each of said second ring surfaces having a plurality of second recessed ring openings, each of said second recessed ring openings receiving a fastener, said second recessed ring openings being constructed and arranged to dispose said fasteners interior to said second ring surface;
   c. a second main shaft traversing between said right side wall and said left side wall, said second main shaft being an axis of rotation for a second pipe shaft secured to said second main shaft in said interior of said hopper, said second pipe shaft having a second pipe shaft diameter dimension being larger than thirteen inches, said second pipe shaft having a third end and a fourth end, said third end being disposed interior to said third lap over ring and said fourth end being disposed interior to said fourth lap over ring, said second pipe shaft having a plurality of second rings, said plurality of second rings extending outwardly from said second pipe shaft, each of said plurality of second rings having said second ring surface;
   d. a plurality of first tooth plates, each of said first tooth plates having at least one first tooth, each of said first tooth plates being releasably secured to one of said first rings;
   e. a plurality of second tooth plates, each of said second tooth plates having at least one second tooth, each of said second tooth plates being releasably secured to one of said second rings;
   f. a first drive motor positioned to said exterior of said hopper, said first drive motor being engaged to said first main shaft, said first drive motor rotating said first main shaft and said first pipe shaft at a first rate of rotation and in a first direction of rotation; and
   g. a second drive motor positioned to said exterior of said hopper, said second drive motor being engaged to said second main shaft, said second drive motor rotating said second main shaft and said second pipe shaft at a second rate of rotation and a second direction of rotation, said second rate of rotation being slower than said first rate of rotation, said second direction of rotation being in an inboard direction relative to said first direction of rotation, wherein said at least one first tooth and said at least one second tooth reduce the size of packaging and food transported inside of said packaging upon placement of said packaging in said hopper and contact with said at least one first tooth and said at least one second tooth during rotation of said first pipe shaft and said second pipe shaft.

2. The package reducing device according to claim 1, said hopper further having a front side wall, a rear side wall and an open bottom.

3. The package reducing device according to claim 2, wherein said first lap over ring and said second lap over ring each have a first lap over ring diameter dimension which is larger than said first pipe shaft diameter dimension by ¼ inch, and said third lap over ring and said fourth lap over ring each have a second lap over ring diameter dimension which is larger than said second pipe shaft diameter dimension by ¼ inch.

4. The package reducing device according to claim 3, wherein said first lap over ring is horizontally aligned with said second lap over ring and said third lap over ring is horizontally aligned with said fourth lap over ring.

5. The package reducing device according to claim 4, wherein said plurality of first rings, extend perpendicularly outward from said first pipe shaft and said plurality of second rings, extend perpendicularly outward from said second pipe shaft.

6. The package reducing device according to claim 5, wherein said first rings have an inner first ring diameter dimension of 16 inches and an outer first ring diameter dimension of 20.5 inches.

7. The package reducing device according to claim 5, wherein said second rings have an inner second ring diameter dimension of 16 inches and an outer second ring diameter dimension of 20.5 inches.

8. The package reducing device according to claim 5, wherein at least two of said plurality of first rings on said first pipe shaft are adjacent to each other and are separated by a dimension of 4.25 inches.

9. The package reducing device according to claim 5, wherein at least two of said plurality of second rings on said second pipe shaft are adjacent to each other, and are separated by a dimension of 4.25 inches.

10. The package reducing device according to claim 5, wherein said plurality of first rings and said plurality of second rings each have an exterior tooth plate surface.

11. The package reducing device according to claim 10, wherein each of said exterior tooth plate surfaces have a plurality of exterior tooth plate surface recessed openings, said exterior tooth plate surface recessed openings being constructed and arranged to receive said fastener, said fastener having fastener ends, and to position at least one of said fastener ends interior to said exterior tooth plate surface.

12. The package reducing device according to claim 5, wherein each of said first tooth plates have at least two first teeth and each of said second tooth plates have at least two second teeth.

13. The package reducing device according to claim 5, wherein at least two of said plurality of first tooth plates on said first pipe shaft are adjacent to each other and are separated by a dimension of 4.25 inches.

14. The package reducing device according to claim 5, wherein at least two of said plurality of second tooth plates on said second pipe shaft are adjacent to each other, and are separated by a dimension of 4.25 inches.

15. The package reducing device according to claim 5, wherein each of said first drive motor and said second drive motor include a variable frequency drive.

16. The package reducing device according to claim 5, wherein said first rate of rotation and said second rate of rotation equal or exceed 3.5 RPM and are equal to or less than 26.5 RPM.

17. The package reducing device according to claim 5, wherein said first rate of rotation is equal to or greater than 1 and equal to or less than 7.5 times faster than said second rate of rotation.

18. The package reducing device according to claim 5, wherein at least one of said front side wall and said rear side wall have stripper bars.

19. The package reducing device according to claim 5, wherein said first main shaft has a first main shaft end and a second main shaft end and said second main shaft has a third main shaft end and a fourth main shaft end, said first main shaft end traversing said left side wall and said third main shaft end traversing said right side wall.

\* \* \* \* \*